United States Patent [19]

Cowley

[11] 4,203,961
[45] May 20, 1980

[54] CHLORINE DIOXIDE GENERATION PROCESS

[75] Inventor: Gerald Cowley, Mississauga, Canada

[73] Assignee: Erco Industries Limited, Islington, Canada

[21] Appl. No.: 964,681

[22] Filed: Nov. 29, 1978

[51] Int. Cl.² ........................................... C01B 11/02
[52] U.S. Cl. ..................... 423/478; 422/228; 261/79 A; 55/204; 55/459 B
[58] Field of Search ..................... 423/477, 478, 659; 261/79 A; 422/129, 187, 234, 228; 55/204, 459 B, 237, 238, 92

[56] References Cited

U.S. PATENT DOCUMENTS

| 3,722,185 | 3/1973 | Miczak | 261/79 A |
| 3,895,100 | 7/1975 | Cowley | 423/478 |
| 3,975,506 | 8/1976 | Cowley | 423/478 |
| 3,990,870 | 11/1976 | Miczak | 261/79 A |

FOREIGN PATENT DOCUMENTS 920203 3/1963 United Kingdom .................. 261/79 A Primary Examiner—Brian E. Hearn
Attorney, Agent, or Firm—Sim & McBurney

[57] ABSTRACT

The entrainment of reaction medium in the vapor phase is decreased in a chlorine dioxide generator producing a gaseous mixture of chlorine dioxide, chlorine and steam from a boiling reaction medium and wherein generator liquor is recycled with make up chemicals by providing a tangential entry of recycled liquor to the generator in the vapor space above the liquid level in the generator and a helically-arranged baffle projecting inwardly from the generator wall at least in the height of the generator corresponding to the tangential entry opening into the vapor space. The baffle is arranged to be above the trajectory of the recycled liquor as it enters the generator. Decreased liquor entrainment enables the generator diameter to be decreased, with consequentially decreased capital costs.

7 Claims, 4 Drawing Figures

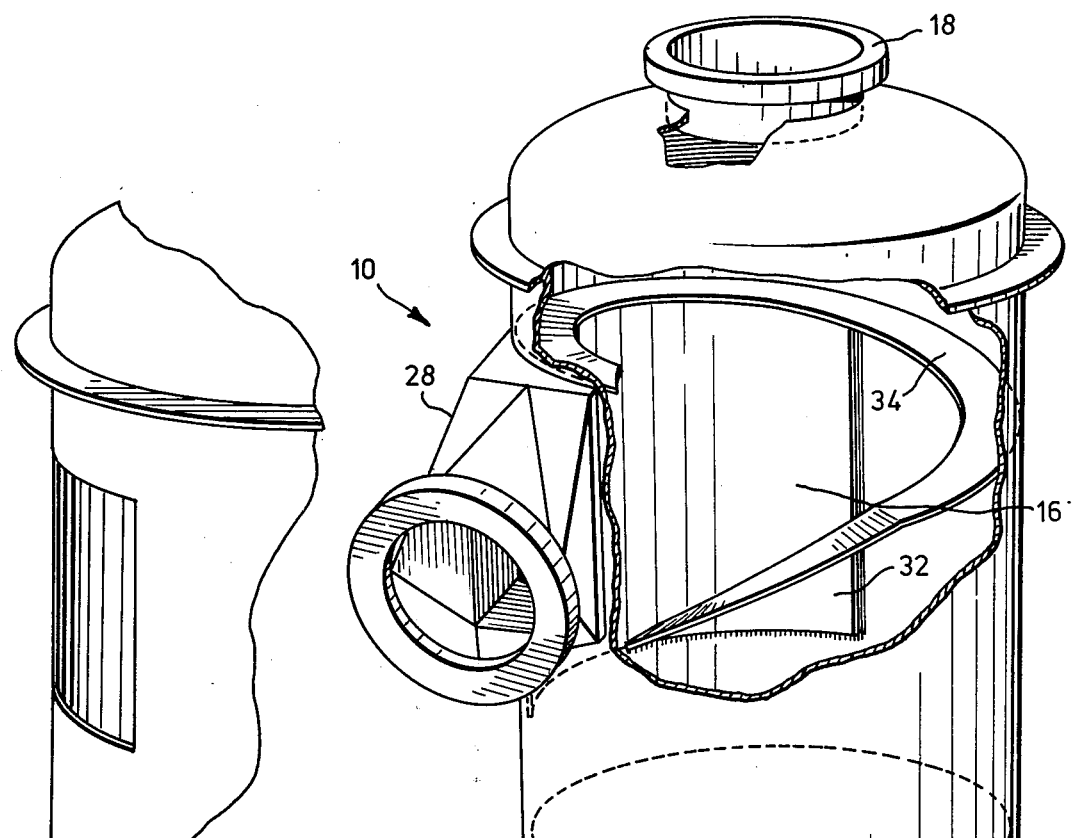
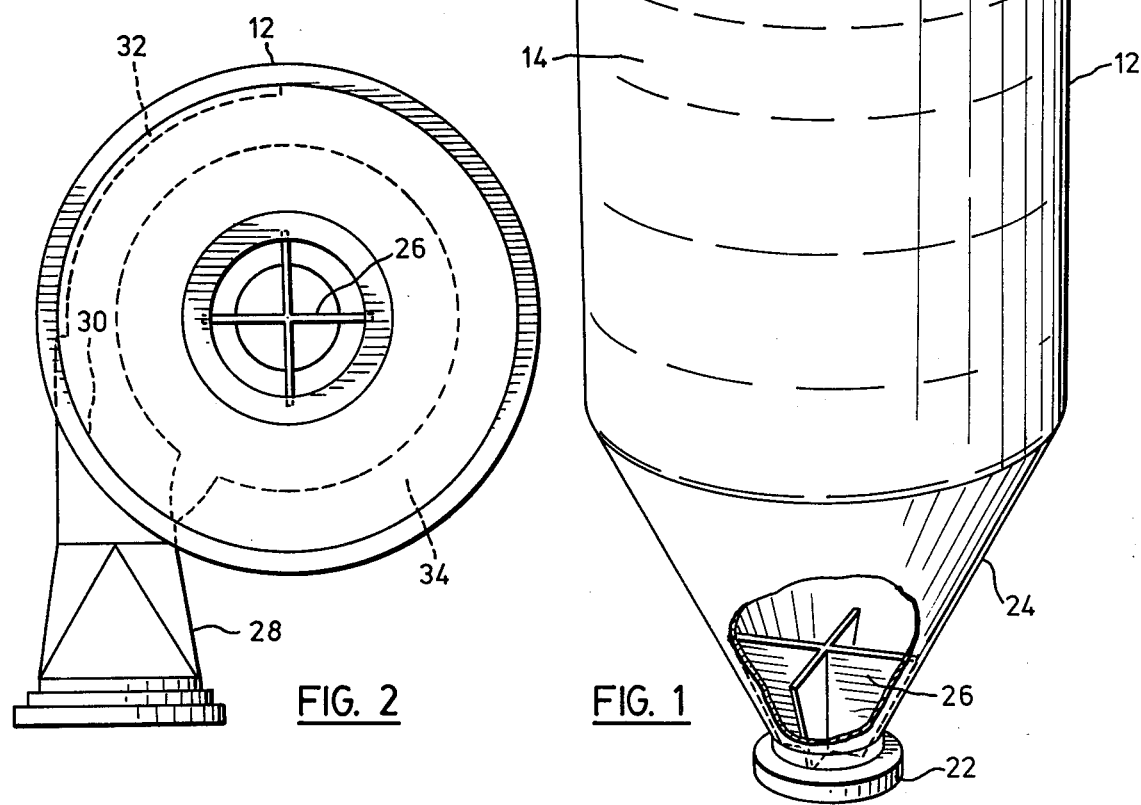

CHLORINE DIOXIDE GENERATION PROCESS

FIELD OF INVENTION

The present invention relates to a novel chlorine dioxide generator and to the production of chlorine dioxide using such generator.

BACKGROUND OF THE INVENTION

Chlorine dioxide is utilized in a variety of bleaching operations, particularly in the bleaching of cellulosic fibrous material, such as, wood pulp. In U.S. Pat. Nos. 3,895,100 and 3,975,506 assigned to the assignee of this application, the disclosures of which are incorporated herein by reference, there is disclosed a chlorine dioxide generating process and equipment therefor wherein chlorine dioxide is formed in a generally cylindrical upright reaction vessel by reduction of an alkali metal chlorate, usually sodium chlorate, with chloride ions in an aqueous acid reaction medium, in accordance with the equation:

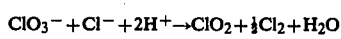

$$ClO_3^- + Cl^- + 2H^+ \rightarrow ClO_2 + \tfrac{1}{2}Cl_2 + H_2O$$

The reaction medium in the generator is maintained at its boiling point, generally about 25° C. to about 90° C., under a subatmospheric pressure, generally about 20 to about 400 mm Hg, to cause the deposition of a by-product salt from the reaction medium in the generation vessel once saturation has been achieved after start-up and to remove the chlorine dioxide and chlorine in gaseous admixture with steam.

The by-product salt which is precipitated depends on the acid used in the reaction medium, the by-product being a sodium sulphate when sulphuric acid is used and sodium chloride and/or hydrogen chloride provide the chloride ion reducing agent, and the by-product being sodium chloride when hydrochloric acid is used and also provides the reducing agent.

When sulphuric acid is used, the sodium sulphate may be in an acidic or neutral form depending on the total acid normality of the generator, with a neutral salt generally being obtained at total acid normalities of about 2 to about 5 normal and acid salts being obtained at higher values usually up to about 12 normal.

When the total acid normality of a sulphuric acid based system is such as to produce neutral sodium sulphate, it is preferred to use a reaction temperature above about 30° C. in order to obtain the anhydrous salt.

When hydrochloric acid is used, the actual hydrogen ion concentration in the reaction medium is maintained in the range of about 0.05 to about 0.3 normal. The term "actual hydrogen ion concentration", as used herein, is the value determined by a pH meter calibrated on an 0.1 normal solution of hydrochloric acid on the assumption that such a solution is 100% dissociated at this concentration.

As described in the above-mentioned patents, the solid by-product is removed as a slurry in reaction medium from the generator vessel, sodium chlorate solution is mixed therewith, the mixture is recycled through a reboiler wherein the mixture is heated to the reaction temperature and forwarded to the reaction vessel after the addition of acid to the heated mixture. A portion of the slurry is withdrawn prior to the reboiler for crystal separation.

The heated mixture from the reboiler is passed through a venturi-like pipe which exerts sufficient back pressure on the mixture in the reboiler to prevent boiling therein, acid in concentrated form is introduced to the collar of the venturi and the resultant reaction mixture is allowed to expand at low acceleration to permit boiling and gaseous product formation to occur evenly and gradually and thereby avoid bumping and vibration, so that a fluid mixture of solid phase, liquid phase and gaseous phase enters the generator generally radially of the generator above the liquid level therein through a curved pipe joining the downstream end of the venturi-like pipe and the generation vessel inlet.

While this prior art procedure represents an excellent commercially-viable chlorine dioxide generating system having many advantages over prior art arrangements, as described in the above-mentioned patents, it has been found that entrainment of liquid and solid phases in the gaseous phase occurs, necessitating a considerable vapor space in the generator to achieve separation of the entrained material by the action of gravitational forces, otherwise the entrained material passes out of the generator with the removed gases, presenting problems in later-processing of the gases and is considered undesirable.

One prior art suggestion for overcoming the entrainment problem without the use of excessive vapor space is to use an internal demister, as described, for example, in U.S. Pat. No. 4,079,123, but such demisters, consisting usually of wire mesh through which the vapor phase passes and on which the liquid droplets impinge, are prone to clogging especially since the solid phase is also present, and hence must be cleaned frequently if chlorine dioxide production is to be sustained.

SUMMARY OF INVENTION

In accordance with the present invention, modifications to the generation system described in our U.S. Pat. No. 3,895,100 are effected in order to decrease entrainment of liquid and solid in the vapor phase and thereby permit a decrease in the vapor space volume without the need to use mesh or other type demisters.

The modifications involve provision of tangential entry for recycled liquor to the vapor space and provision of substantially helically-arranged baffle means projecting from the internal wall of the generator and extending substantially through 360° of turn in the vertical height of the tangential entry opening in location above the theoretical trajectory of liquor tangentially entering the generator and passing around the internal wall.

The tangential entry of the recycled mixture and the provision of the baffle means combine to decrease entrainment of liquid and solid phases in the gaseous phase, so that a smaller diameter vessel of lesser vapor space volume may be used to achieve gravitational separation of the material which is entrained.

Provision of a smaller diameter generator results in less material of construction being necessary for the generator, which usually is constructed of titanium owing to its high corrosion and wear resistance and excellent constructional qualities.

BRIEF DESCRIPTION OF DRAWINGS

FIG. 1 is a perspective view with parts cut away of a chlorine dioxide generator constructed in accordance with one preferred embodiment of the invention; and FIG. 2 is a view from below of the generator of FIG. 1, FIG. 3 is a detial view of part of the generator of FIG. 1 with the entry pipe removed.

DESCRIPTION OF PREFERRED EMBODIMENT

Figure 4:
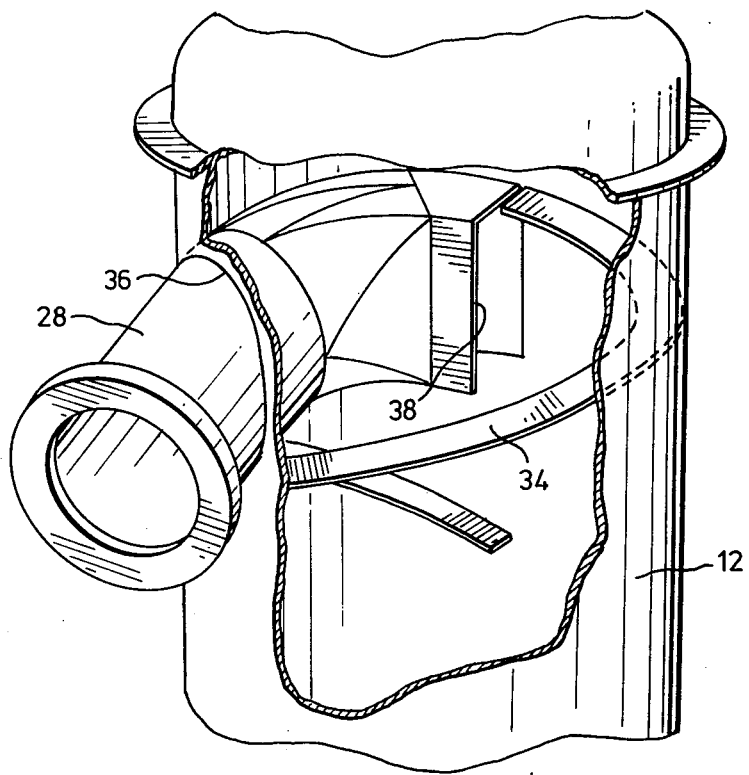
FIG. 4 is a perspective view, with parts cut away, of part of a chlorine dioxide generator constructed in accordance with a second embodiment of the invention.

Referring first to FIGS. 1 to 3 of the drawings, a chlorine dioxide generator 10 constructed in accordance with a preferred embodiment of the invention and representing the current best mode of the invention known to the inventor, comprises a generally cylindrical upright vessel 12 fabricated of any convenient corrosion- and wear-resistant material, preferably titanium.

The generator vessel 12 contains liquid reaction medium 14 which produces a gaseous mixture of chlorine dioxide, chlorine and steam which is removed from the vapor space 16 above the liquid level through a gaseous outlet 18 located in a top closure 20.

The reaction medium 14 is maintained at its boiling point under a subatmospheric pressure applied to the vapor space 16 through the gaseous outlet 18. In continuous operation, a solid by-product salt precipitates from the liquid reaction medium 14 and is removed through a solid outlet 22 located at the lower end of the vessel 12 in communication with a conical bottom closure element 24 as a slurry with reaction medium. The slurry then is processed to remove part of the solid phase and a recycle heated reaction mixture is formed, as described in detail in U.S. Pat. No. 3,895,100, referred to above.

A vortex breaker element 26, consisting of perpendicularly arranged baffles, is located in the bottom closure 24 adjacent the slurry outlet 22 to break up rotational movement of the reaction medium 14 adjacent the slurry outlet 22.

The heated reaction mixture recycle pipe illustrated in U.S. Pat. No. 3,895,100 communicates with a horizontally-directed inlet pipe 28 which increases in cross-sectional area in the direction of flow of the reaction mixture and terminates in a rectangular opening 30 in the side wall of the generator vessel 12 above the level of the reaction medium 14. The inlet pipe 28 extends generally tangentially to the vessel wall so that recycled heated reaction mixture enters the vapor space 16 generally tangentially to the internal wall of the generator vessel 12.

The recycled heated reaction mixture contains crystalline by-product salt which is abrasive in character. Although titanium is a highly wear-resistant material, it is preferred to construct the vessel 12 with a titanium liner 32 at least in the initial region of movement of the recycled heated reaction mixture between its entry to the vessel 12 and the reaction medium 14. In the event of excessive wear, the liner 32 may be replaced.

Extending horizontally inwardly from the internal wall of the vessel 12 is a baffle 34. The baffle 34 extends in generally helical manner from a location just above the inlet opening 30 through 360° of turn to terminate just below the level of the inlet opening 30. The baffle 34 may extend further, if desired, into the reaction medium 14.

The location of the baffle 34 is important to this invention and should approximate but be located above the intended trajectory of the recycled reaction mixture along the internal wall of the vessel 12 to the reaction medium 14.

The location of the baffle 34 above the intended trajectory prevents impingement of the mixture thereon which may impair liquid separation and cause liquid to climb up the internal wall of the generator vessel 12.

Any liquor which does rise up the internal wall of the generator vessel 12 above the baffle 34 is prevented from entering the outlet pipe 18 by the downward projection of the cylindrical outlet pipe inside the generator vessel 12, as illustrated.

The baffle 34 prevents the gaseous phase in the recycled reaction mixture entering through opening 30, which is a fluid mixture of liquid phase, solid phase and gaseous phase as described in U.S. Pat. No. 3,895,100, from proceeding upwardly in the vapor space 16, taking with it entrained liquid and solid phases. Instead, the baffle 34 forces the gaseous phase initially to follow the trajectory of the liquid and solid phases and to move effectively radially of the internal wall of the vessel 12 before moving upwardly in the vapor space 16 when it clears the radially inner edge of the baffle 34.

This gaseous phase motion causes separation of liquid and solid phases which tend to remain in the same trajectory and hence entrainment of these materials in the gaseous phase is decreased, permitting the cross-sectional area of the generator vessel 12 to be decreased, as compared with the radial-entry and no-baffle arrangement illustrated in U.S. Pat. No. 3,895,100. For example, for a given reaction vessel of a given chlorine dioxide production capacity and operating under the same conditions and flow rates, the overall generator vessel 12 cross-sectional area may be decreased by about 40% through the use of this invention.

For ease of fabrication of the baffle 34, it is usually constructed, as illustrated, of a plurality of segments which are joined to form a continuous baffle, each segment typically extending for 90° of turn or a multiple thereof with its slope being rectilinear from end to end and approximating the average of the trajectory of the liquid passing around the internal wall in the particular curvilinear region of location of the baffle segment.

Alternatively, the baffle 34 may be provided as a continuous baffle which is continuously shaped along its length to approximate at any given location the trajectory of the liquid passing around the internal wall of the generator vessel 12.

The required location and slope of the baffle 34 depends on a number of factors, including the velocity of the fluid entering the port 30 and the internal diameter of the generator vessel 12, and can be readily calculated using conventional engineering principles.

The transverse dimension, or width, of the baffle 34 may vary widely and is generally related to the width of the rectangular inlet port 30. Preferably, the width of the baffle 34 is about 30 to about 60 percent of the width of the rectangular inlet port 30, and most preferably about one-half of the width, since the most efficient separation of entrained material occurs at this dimension.

The rectangular inlet port 30 is dimensioned in relationship to the internal diameter of the generator vessel 12, so that the width is less than, and preferably approximately equal to, about 25 percent of the internal diameter of the vessel 12, since liquid separation from the gaseous phase is generally less satisfactory at higher values.

The inlet port 30 is illustrated as rectangular in shape, but any other desired shape may be used, for example, circular or oval.

The tangential entry of recycled reaction mixture to the generator vessel 12 under the influence of energy imparted thereto by expanding steam in the recycle pipe causes the reaction medium 14 to rotate in the generator vessel and to acquire the steam-imparted energy. In place of breaking this motion at the outlet port 22 using the vortex breaker 26 as illustrated, a tangential outlet may be provided adjacent a suitably-designed bottom closure and the motion energy of the exiting reaction medium may be used to replace part of the pumping energy required for recirculation, so that the overall energy requirements of the system are decreased.

DESCRIPTION OF ALTERNATIVE EMBODIMENT

Referring now to FIG. 4, wherein there is disclosed an alternative recycled heated reaction mixture entry arrangement, the same reference numerals are used to identify the same parts as are described above in connection with the embodiment of FIGS. 1 to 3.

In the embodiment of FIG. 4, instead of the inlet pipe 28 terminating at a rectangular or other shaped opening 30 in the wall of the vessel 12 to achieve tangential entry, the pipe 28 passes through an opening 36 in the wall of the vessel 12 in sealing relationship therewith and then follows the internal wall of the vessel 12 to terminate in a rectangularly-shaped opening 38 to establish the tangential entry. The baffle 34 commences immediately at the termination of the inlet pipe 28.

The dimensional relationships described above with respect to FIGS. 1 to 3 between the baffle 34 and the rectangular opening 30 apply in connection with the embodiment of FIG. 4 as between the baffle 34 and the rectangular opening 38.

While the rectangular opening 38 and the passageway leading thereto in the increasing cross-sectional area of the inlet pipe 28 may be enclosed on four sides, it is preferred, as illustrated, to omit the bottom wall.

SUMMARY OF DISCLOSURE

The present invention, therefore, provides a chlorine dioxide generator having advantages over other prior art equipment wherein a fluid recycle stream consisting of a recycle mixture of gaseous phase, solid phase and liquid phase enters the vapor space of the generator. Modifications are possible within the scope of the invention.

What I claim is:

1. In a continuous method for the production of chlorine dioxide, which comprises:
    continuously maintaining a chlorine dioxide-producing reaction medium in an enclosed upright cylindrical reaction zone having a vapor space located above the liquid level of said reaction medium in said reaction zone, the reaction medium containing an alkali metal chlorate, a reducing agent capable of reducing said alkali metal chlorate to chlorine dioxide and chlorine, and a strong mineral acid,
    continuously generating chlorine dioxide and chlorine from said reaction medium and continuously evaporating water from said reaction medium at substantially the boiling point thereof while the reaction zone is maintained under a subatmospheric pressure,
    continuously removing from said reaction zone a gaseous mixture of said generated chlorine dioxide and chlorine and evaporated water through a gaseous outlet located in communication with said vapor space in said reaction zone,
    continuously depositing in said reaction zone an alkali metal salt of the anion of said strong acid, removing from a lower portion of said reaction zone a slurry containing deposited alkali metal salt and part of said reaction medium and recovering alkali metal salt from a portion of said slurry,
    admixing alkali metal chlorate with said remainder of said slurry,
    heating recycled material substantially to an elevated temperature which is the boiling point of the reaction medium at the prevailing absolute pressure in said reaction zone,
    accelerating the heated material in admixture with alkali metal chlorate, and also reducing agent when said strong mineral acid is not also the reducing agent, to establish a back pressure exceeding the difference in saturation vapor pressure of the heated mixture and of said reaction medium,
    adding strong mineral acid to said accelerated heated mixture substantially at the maximum velocity of said mixture resulting from said acceleration to provide a feed material for said reaction zone,
    allowing gaseous material in said feed material to expand while maintaining a low rate of acceleration, and
    feeding said expanded feed mixture into said vapor space,
    the improvement which comprises effecting said feeding of expanded feed mixture into said vapor space generally tangentially of the internal wall of said reaction zone, and
    inducing said gaseous material to follow the flow path of said expanded feed mixture from inlet to said reaction zone to said reaction medium and to flow radially inwardly of the internal wall of the reaction zone prior to upward passage through said vapor space towards said gaseous outlet.

2. The method of claim 1 wherein said alkali metal chlorate is admixed with said remainder of said slurry by adding said alkali metal chlorate as an aqueous solution thereof to said removed slurry prior to said recovery of alkali metal salt from a portion of the slurry and prior to said heating step; a portion of the resulting slurry is removed and said alkali metal salt is recovered from said removed portion; and the remainder of said resulting slurry is heated to said elevated temperature as said heated recycled material.

3. The method of claim 1 wherein said alkali metal chlorate is sodium chlorate, said reducing agent is sodium chloride and said strong mineral acid is sulphuric acid.

4. The method of claim 1 wherein said alkali metal chlorate is sodium chlorate and said reducing agent and strong mineral acid are hydrochloric acid.

5. The method of claim 3 or 4 wherein said strong acid is added to the accelerated heated liquid in substantially concentrated form.

6. The method of claim 1, 2, 3 or 4 wherein said tangential entry of said expanded feed mixture is effected through a rectangularly-shaped opening communicating with said cylindrical zone.

7. The method of claim 6 wherein said gaseous material is induced to follow said flow path and to move radially inwardly of the internal wall of the reaction vessel by positioning radially-inwardly directed baffle means above and substantially following the flow path of said expanded mixture from inlet to said reaction medium.

* * * * *